May 6, 1941.   C. A. BAUER   2,240,900

PROCESS OF DECORATING PLASTICS

Filed Oct. 28, 1940

INVENTOR.
CHARLES A. BAUER,
BY
ATTORNEYS.

Patented May 6, 1941

2,240,900

UNITED STATES PATENT OFFICE 2,240,900

PROCESS OF DECORATING PLASTICS

Charles A. Bauer, Newburg, Ind., assignor to The Cardinal Corporation, Evansville, Ind., a corporation of Indiana Application October 28, 1940, Serial No. 363,146

8 Claims. (Cl. 41—22)

It has heretofore been proposed to form designs in transparent articles by recessing the rear face of the article in predetermined pattern and by applying an opaque coating to the walls of the recess or recesses. When an article so decorated is viewed through its front face, the coated walls of the recess appear as the surfaces of an object inlaid into the rear face of the article.

My invention relates to articles of the type just described and has for its object the application of designs in color to the bottom walls of the recesses referred to. More specifically, it is my object to apply such designs in color by a method which lends itself to rapid and economical production. Ordinary printing or stenciling methods are not suitable for my purpose both because of the difficulty in working at the bottom of a recess and because of the fact that inevitable variations in the size and shape of the recesses makes difficult the proper location of any stencil, stamp, or die used in applying the design in color.

In carrying out my invention I produce the articles which are to be decorated of a clear transparent plastic by a molding process, forming the recesses in the rear walls of the articles during the molding. Portions of the bottom wall of the recess which are to receive a color different from the immediately surrounding portions of the bottom wall of the recess are raised a short distance above such surrounding portions. To apply the color to the raised portions of the bottom wall of the recess, I employ roll-leaf, which comprises paper or similar flexible sheet material one face of which bears a colored coating capable of becoming bonded to the plastic when pressed thereagainst and subjected to heat. Such material is well known. One or more pieces of roll-leaf, which may be cut roughly to the proper shape, are laid, coating-side down, over the raised portions of the bottom wall of the recess in the rear face of the plastic article, and are then forced firmly into contact with such raised portions by a heated punch having an end face large enough to cover all the raised portions to which the color is to be applied. As a result of the application of heat and pressure, the colored coating on the paper or other sheet material is transferred to the raised portions of the bottom wall of the recess. After the raised portions of the bottom wall of the recess have been colored in the manner indicated, the remaining portions of the recess walls may be coated with an opaque coating material of contrasting color.

Figure 1:
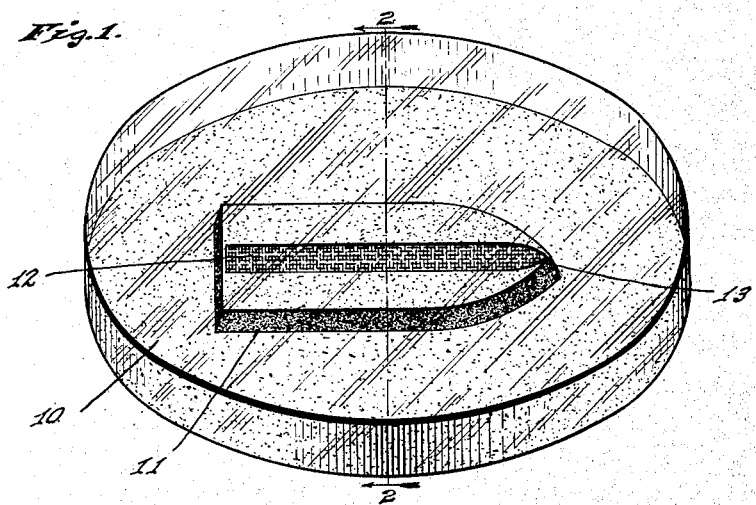
Figures 2, 3:
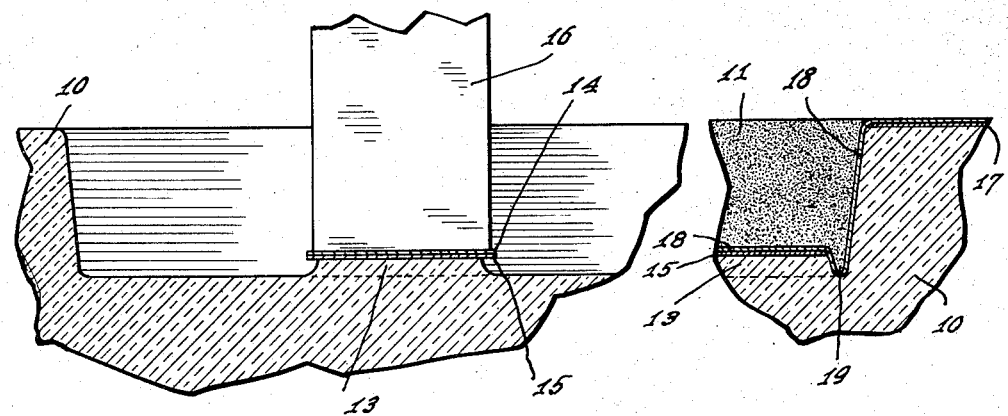
Figure 4:
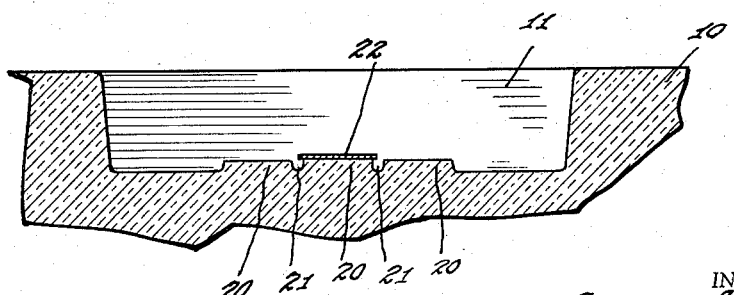

The accompanying drawing illustrates my invention: Fig. 1 is an isometric view of a circular disk of transparent material decorated by the process forming the subject matter of this application; Fig. 2 is a fragmental vertical section on the line 2—2 of Fig. 1; Fig. 3 is a fragmental section on the line 3—3 of Fig. 2; and Fig. 4 is a fragmental section similar to Fig. 2 but illustrating a modified type of design.

The circular disk 10 shown in the drawing may be of any desired transparent material, but is preferably formed of a thermoplastic plastic such, for example, as cellulose acetate. As shown, the disk is decorated by what appears to be a shield-shaped object inlaid into its rear face. This appearance is created by providing the rear face of the disk with a shield-shaped recess 11 and by coating the walls of such recess with an opaque coating material which, when viewed through the front face of the disk, appears to constitute the exterior surfaces of a solid object.

By way of example for the purpose of illustrating my invention, I have shown the bottom wall of the recess 11 as bearing a centrally disposed longitudinally extending stripe 12 of a color contrasting with that applied to the balance of the walls of the recess 11. It will be obvious that if the stripe 12 is displaced from the center of the recess an unsymmetrical and therefore unsatisfactory appearance will result. To insure that the stripe 12 will be properly located in the desired position on the bottom wall of the recess 11, such bottom wall is formed during the molding of the disk 10 to provide an elevated portion 13 the upper surface of which corresponds in size, shape, and location to the stripe 12. After the disk has been molded, it is positioned with its recessed face upward and a piece of roll-leaf 14 having its lower face covered with an opaque colored coating 15 is placed over the elevated portion 13 of the bottom wall of the recess, as indicated in Fig. 2, and is then forced into engagement with the elevated wall-portion 13 by a heated punch 16. As the result of the action of heat and pressure, the coating 15 is transferred from the paper backing to the surface of the elevated wall-portion 13, and after this has occurred the punch 16 and paper backing are removed from the recess.

The end face of the punch 16 should be large enough to cover completely the elevated wall-portion 13, and may be as much larger as the size of the recess will permit. When possible, it is desirable to have the end face of the punch larger in all dimensions than the elevated wall-portion 13, as this makes it unnecessary to locate the punch accurately relative to the disk.

After application of the colored coating to the wall-portion 13, the balance of the recessed rear face of the disk 10 can be finished in any desired manner. If it is desired to have the color of the recess walls contrast with the color of the unrecessed portions of the rear face of the disk 10, a plug corresponding in shape to the recess 11 may be inserted therein to mask the recess walls while a coating of opaque coloring material 17 is applied to the unrecessed portions of the rear face of the disk. The plug may then be removed and the recess-walls coated with a second colored coating material 18. In applying the coating 18, it is not necessary to mask the raised portion 13 of the bottom wall of the recess or the unrecessed portions of the rear face of the disk; for the opacity of the coatings 15 and 17 will prevent the coating 18 from being visible except where it is applied directly to the recess-walls.

It will be noted from Fig. 3 that the elevated portion 13 of the bottom wall of the recess is separated from the end wall of the recess by a groove 19. In the absence of such a groove, it would be difficult to properly define the ends of the stripe 12, as color from the roll-leaf 14 would be applied to any portion of the recess-wall against which the roll leaf was held by the punch 16. With the groove 19 present, however, the inner edge of such groove definitely defines the end of the stripe 12.

The extent to which the portion or portions 13 are elevated above the bottom wall of the recess 11 may be so slight as to be substantially imperceptible under visual inspection through the body of the disk. It is necessary only that there be sufficient difference in elevation to insure that the roll-leaf will not be forced against the unelevated portions of the recess-bottom. To insure this result, a difference in elevation of a few thousandths of an inch will be adequate.

In the design shown in Figs. 1, 2, and 3, the bottom wall of the recess embodies but one area which is to be colored with a color contrasting to that applied to the remaining portions of the recess walls. My invention, however, is not limited in its application to such a design. For example, if it should be desired to substitute three parallel stripes for the single stripe 12, the disk might be molded as indicated in Fig. 4 with three parallel raised portions or ribs 20 corresponding to the three stripes which are to be produced and separated by grooves 21. If all three of the stripes are to be of the same color, a single piece of roll-leaf wide enough to cover the three ribs 20 may be laid over them and pressed against them by a heated punch of suitable dimensions. Color would thus be transferred from the roll-leaf to the upper surface of the three ribs 20, but no color could be applied to the walls of the grooves 21 and, as a result, three distinct colored stripes would be visible through the front face of the disk.

If it should be desired, in the design shown in Fig. 4, to color the stripes differently, individual pieces of roll-leaf might be laid over the respective ribs 20. Thus, if it should be desired to color the center rib differently from the two ribs beside it, a strip of roll-leaf 22 broad enough to cover such center rib would be employed. The grooves 21 would permit some variation in the width of the roll-leaf 22 and would also permit some inaccuracy in its location, it being necessary only that the strip 21 not overlap either of the outer ribs 20. After the color has been transferred from the roll-leaf 22 to the center rib 20 by the application of heat and pressure, a second color can be applied to the other two ribs either by the use of a single strip of roll-leaf broad enough to overlap both ribs or by the use of a separate strip for each rib. If a single piece of roll-leaf is used in the application of colored coating material to the two outside ribs, the punch employed should be relieved over the center rib so as to avoid the application of heat and pressure thereto; as otherwise the differently colored coatings might blend over the surface of the center rib.

For the sake of simplicity of illustration and description, the designs shown herein are uncomplicated in character; but it will be understood that there is substantially no limit to the intricacy of the designs which can be produced by my process. No matter how complicated the design, those areas of the bottom recess-wall which are to be colored with roll-leaf are formed, during molding, to have an elevation above immediately adjacent areas which are not to be colored with roll-leaf. When roll-leaf is applied under heat and pressure, the colored coating on it engages only the elevated areas with the result that no color is applied to the immediately adjacent depressed areas. Since the areas to be colored with roll-leaf are located and sharply defined during the molding operation, the desired design in color will be accurately reproduced and accurately located relatively to the side walls of the recess.

In the drawing, the punch 16 by which heat and pressure are applied to the roll-leaf is shown as having a plane-end face, but this is only because the area or areas to which color from the roll-leaf is to be applied, being uniformly elevated above the plane bottom wall of the recess 11, are plane and coplanar. Obviously, the areas to be colored by roll-leaf need not be plane or coplanar provided the end face of the punch 16 is properly shaped to engage them.

I claim as my invention:

1. A process of ornamenting a transparent article having a recess in its rear face, which comprises forming on the bottom wall of the recess a design in low relief, the elevated portion or portions of such design having upper faces constituting discrete parts of a continuous surface, laying upon said elevated portions a sheet of roll leaf having on its lower surface a colored coating, and transferring such coating to the upper faces of the elevated portions of the bottom wall of the recess by the application of heat and pressure to the upper surface of the roll leaf.

2. A process of ornamenting a transparent article having a recess in its rear face, which comprises forming on the bottom wall of the recess a design in low relief, the elevated portion or portions of such design having upper faces which are flat and coplanar, laying upon said elevated portions a sheet of roll leaf having on its lower surface a colored coating, and transferring such coating to the upper faces of the elevated portions of the bottom wall of the recess by the application of heat and pressure to the upper surface of the roll leaf.

3. A process of ornamenting a transparent article having a recess in its rear face, which comprises forming on the bottom wall of the recess a design in low relief, the elevated portion or portions of such design having upper faces constituting discrete parts of a continuous surface, laying upon said elevated portions a sheet of roll leaf having on its lower surface a colored opaque coating, transferring such coating to the upper faces of the elevated portions of the bottom wall of the recess by the application of heat and pressure to the upper surface of the roll leaf, and thereafter applying an opaque coating of contrasting color to other portions of the recess walls.

4. A process of ornamenting a transparent article having a recess in its rear face, which comprises forming on the bottom wall of the recess a design in low relief, the elevated portion or portions of such design having upper faces which are flat and coplanar, laying upon said elevated portions a sheet of roll leaf having on its lower surface a colored opaque coating, transferring such coating to the upper faces of the elevated portions of the bottom wall of the recess by the application of heat and pressure to the upper surface of the roll leaf, and thereafter applying an opaque coating of contrasting color to other portions of the recess walls.

5. A process of ornamenting a transparent article having a recess in its rear face, which comprises forming on the bottom wall of the recess a design in low relief, the elevated portion or portions of such design having upper faces constituting discrete parts of a continuous surface, and bringing into contact with the upper faces of such elevated portions a continuous sheet of opaque coloring material conforming to such continuous surface, and supported on said elevated portions out of contact with depressed portions of the bottom wall of the recess, whereby said coloring material will be applied only to the upper faces of said elevated portions.

6. A process of ornamenting a transparent article having a recess in its rear face, which comprises forming on the bottom wall of the recess a design in low relief, the elevated portion or portions of such design having upper faces which are flat and coplanar, and transferring opaque coloring material to the upper faces of said elevated portions from a continuous, plane sheet of such coloring material supported on said elevated portions out of contact with depressed portions of the bottom wall of the recess.

7. The process set forth in claim 5 with the addition of the subsequent step of applying a coating of contrasting color to other portions of the recess walls.

8. The process set forth in claim 6 with the addition of the subsequent step of applying a coating of contrasting color to other portions of the recess walls.

CHARLES A. BAUER.